April 13, 1965 R. L. BOYLES 3,177,648
AUTOMATIC REGULATOR FOR TIMEKEEPING DEVICES
Filed April 19, 1955 2 Sheets-Sheet 1

Inventor:
Robert L. Boyles,
by Lawrence R. Kempton
His Attorney.

United States Patent Office 3,177,648
Patented Apr. 13, 1965

3,177,648
AUTOMATIC REGULATOR FOR TIME-KEEPING DEVICES
Robert L. Boyles, Wayland, Mass., assignor, by mesne assignments, to King-Seeley Thermos Co., a corporation of Michigan
Filed Apr. 19, 1955, Ser. No. 502,488
22 Claims. (Cl. 58—85.5)

My invention relates to timekeeper devices, such as watches and clocks and the like, and more particularly for arrangements for regulating such timekeeping devices.

It is common practice to provide in connection with watches or clocks some means by which the speed at which the timekeeping device runs can be adjusted. Usually a lever is provided which is accessible in some manner for manual adjustment. To make such manual adjustment accurately and quickly expensive equipment, such as that employed by watchmakers, is necessary in order to compare the speed of the watch with a given standard. Alternatively it is necessary to allow the timekeeping device to run for a sufficient length of time after the adjustment has been made to determine how much it fails to adhere to the correct time, then to make a second adjustment for further compensation, and so on. Since the total amount the regulating member is likely to be moved is very small and since it is difficult to remember the distance it has been moved on the previous adjustment, such manual approach to regulation by the average user is likely to require a great deal of time and considerable effort.

Some prior art devices have attempted to approach the problem of automatic regulation by providing a mechanism whereby the regulator is shifted by an amount proportional to the distance the hands of the timekeeping device are moved in setting it from time to time to the correct time. This has a defect, of course, that when very large shifts are made, for example, when the timepiece has been allowed to run down and stop or when a time zone shift is made, a corresponding very large, and in most cases unnecessary, adjustment in the regulating mechanism is also automatically made.

There has been at least one approach to this problem in which the regulating mechanism is moved by a predetermined fixed amount regardless of the amount that the hands are moved in setting the timekeeping device to the correct time. Thus the regulating mechanism is shifted by precisely the same amount to increase or decrease the speed regardless of the amount that the time indicating elements are moved to set the timekeeping device to the correct time. For example, under this approach the speed of the timekeeping device would be changed by exactly the same amount whether the hands of the watch or clock were moved one minute or one hour during the setting operation. Thus, even though the user may make a regular practice of setting the timepiece once a day or once a week he is unable to make the shift of the regulating mechanism in any way proportional to the amount the timekeeping device has lost or gained time during the elapsed period. Hence, it may require a substantial number of settings of the timepiece to approach the correct regulation. Further, it is difficult to make the final fine adjustment to a reasonably exact regulation because the concluding adjustments may shift the regulator first to one side and then the other of the desired mid-position. The situation is comparable to that which occurs when an attempt is made to set a clock to the exact time with a relatively stiff mechanism requiring the application of a strong force. It is then found that the hands have a tendency to overshoot the correct time in each direction and it requires a substantial amount of effort and continued trial to reach even a reasonable approximation of the correct time.

In accordance with my invention the advantages of the automatic proportional regulating arrangement have been preserved with the resultant improvement in the ability to make a final fine setting to the very close approximation of exact rate regulation. At the same time provision has been made to limit the amount of regulation to a predetermined maximum amount when large shifts in the time setting mechanism are made. In this way, when the aforementioned large shifts are made, for example, when the timekeeping device has run down or when a zone change is necessitated, the change in the regulation is limited to a predetermined amount. While in the case of the watch or clock which has stopped or in the case of time zone change, this still effects an unnecessary change in the setting of the regulating mechanism, the amount is limited so that the error introduced into the timekeeping device is relatively small. Because of the proportional arrangement provided by my invention for small shifts in the time setting mechanism, even this small error may be readily and automatically removed by subsequent settings of the time indicating elements.

It is an object of my invention to provide an improved arrangement for automatically regulating timekeeping devices.

It is another object of my invention to provide an improved arrangement in which such regulation is effected automatically when the user sets the timekeeping device to the correct time in the normal manner.

It is a further object of my invention to provide an improved automatic regulating mechanism for timekeeping devices in which the amount of regulation automatically introduced is limited to a predetermined maximum.

It is still another object of my invention to provide an improved automatic regulating arrangement for timekeeping devices in which the regulation is in proportion to the amount of the movement of the time setting mechanism for relatively small movements and in which further regulation is limited to a predetermined maximum amount regardless of the ultimate amount of the movement the time setting mechanism.

It is a further objective of my invention to provide an improved mechanism for effecting movement of the regulating mechanism when the time setting mechanism is moved to set the timekeeping device to the correct time.

Further objects and advantages of my invention will become apparent as the following description proceeds and the features of novelty which characterize my invention will be pointed out with particularity in the claims annexed to and forming part of this specification.

In carrying out the objects of my invention in one form thereof a pivoted adjusted lever is arranged for transmitting motion to the regulating mechanism. One end of this lever is arranged adjacent the time setting element, which may comprise a normal rotatable shaft, slidable between setting and non-setting position. The time setting element includes a member adapted to engage the adjusting lever for shifting this lever and thereby the regulating mechanism in one direction or the other, depending upon the direction in which the time setting element is moved to set the timekeeping device to the correct time. The movement of the adjusting lever and hence of the regulating mechanism is proportional to the amount of movement of the time setting element. In addition, provision is made for limiting the movement of the adjusting lever, and hence the shifting of the regulating mechanism, to a predetermined maximum amount. This may be accomplished by having the adjusting lever move out of engagement with the time setting element after a predetermined maximum movement of the time setting element or by positively limiting the movement of the adjusting lever to a predetermined maximum amount by providing a stop for engaging the lever after such predetermined maximum amount of movement.

For better understanding of my invention reference may be had to the accompanying drawing in which.

Figure 1:
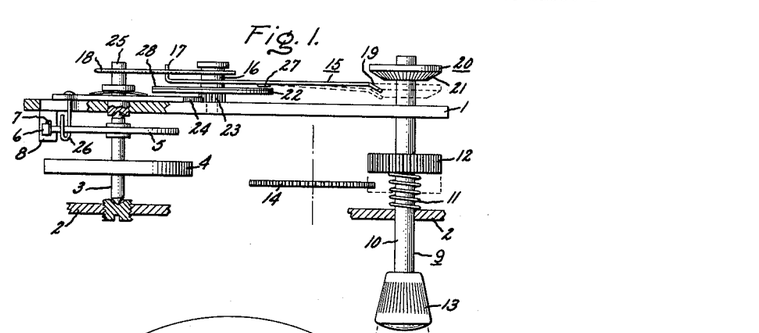
FIG. 1 is an elevation view, partly broken away and showing only essential parts, of a timekeeping device incorporating an embodiment of my invention.
Figures 2, 3, 4, 5, 6:
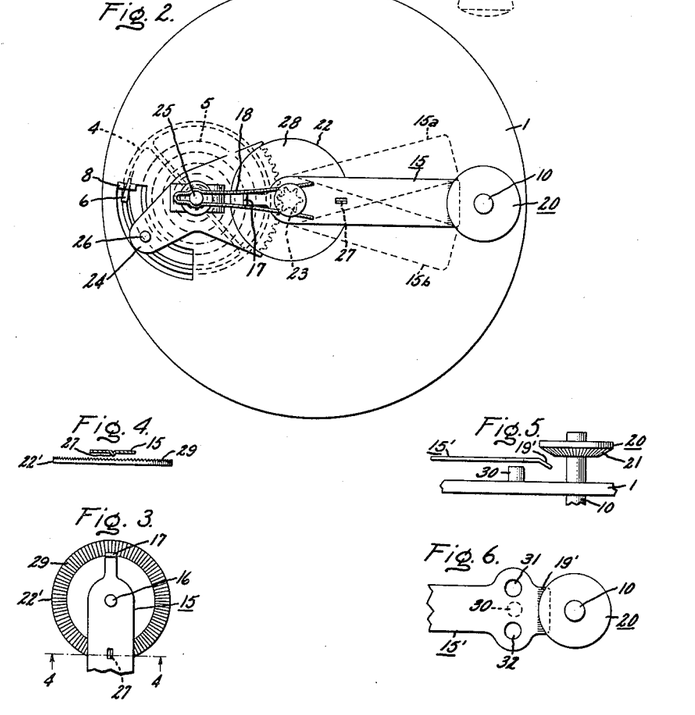
FIG. 2 is a plan view of the mechanism shown in FIG. 1.
FIG. 3 is a plan view of a portion of the mechanism showing a modified form of my invention.
FIG. 4 is a sectional elevation view taken along the line 4—4 of FIG. 3.
FIG. 5 is an elevation view of a portion of a mechanism showing another modified form of my invention.
FIG. 6 is a plan view of the mechanism shown in FIG. 5.

Referring to the drawing, there is shown in FIGS. 1 and 2 a portion of a timekeeping device illustrating one embodiment of my invention. Only the portions of the mechanism essential for the proper illustration of my invention have been included since a complete disclosure of all of the gears normally employed in the average timekeeping device would unduly clutter and confuse the illustration of my invention. The mechanism illustrated in FIGS. 1 and 2 includes a support or mounting plate shown in general outline and indicated by the numeral 1. A second mounting plate 2 spaced from plate 1 is shown, partly broken away, in FIG. 1. A shaft 3 extends between the two plates 1 and 2. A balance wheel 4 and a hairspring 5 are mounted on this shaft. The hairspring governs the rate of oscillation of the balance wheel and operation of the escapement mechanism (not shown) to control the speed of the timekeeping device in the conventional manner.

One end of the hairspring 5 is secured to the shaft 3 and the other end is secured by a wedge 6 in an opening 7 in a depending plate 8 supported from the mounting plate 1. In accordance with my invention the effective length of the hairspring, and hence the rate of oscillation of the mechanism associated therewith, is automatically varied as the timekeeping device is set to the correct time.

The time setting means are shown generally at 9. This means includes a shaft 10 which is rotatably and slidably mounted in openings in mounting plates 1 and 2. The time setting means, including the shaft 10, is biased to the solid line position shown in FIG. 1 by a spring 11, one end of which engages the mounting plate 2 and the other end of which engages a pinion 12. When it is desired to set the time of the timekeeping device, the shaft 10 is moved by means of a knob 13 from the solid line position to the dotted line shown in FIG. 1. This brings the pinion 12 into engagement with a gear 14, so that rotation of the pinion 12 effects rotation of the engaged gear 14. The gear 14 is, of course, connected through the train of gears to time indicating means, including hour and minute hands, in a conventional manner. Since details of this gearing are unnecessary for disclosure of my invention, such unnecessary conventional elements have been omitted from the drawing. Setting of the time is therefore effected by first pulling outwardly on the knob 13 to move the shaft and its associated elements to the dotted line position. The knob is then rotated in one direction or the other to set the hands of the timekeeping device to indicate the correct time. The knob 13 is then released and the spring 11 moves the time setting means 9 back to the solid line position.

In accordance with my invention, an arrangement has been provided whereby when the time setting means is moved to its setting position a mechanism is conditioned for changing the setting of the regulating mechanism and when the knob of the time setting means is rotated to set the time indicating means to the proper time, the regulating mechanism is also shifted in a direction to properly alter the speed of the timekeeping device. Thus, should the timekeeping device be running slow and the time indicating means therefore be moved forward to the correct time by the time setting means, the regulating mechanism will be automatically shifted to cause the timekeeping device to run faster. A converse adjustment is secured if the timekeeping device is running fast so that it is necessary to move the hands backward by the time setting means.

In accordance with my invention mechanism is provided between the time setting means and the regulating mechanism to accomplish the aforementioned regulation automatically. This mechanism includes a loosely pivoted adjusting lever 15. The lever 15 is pivotally mounted on a shaft 16 for lateral movement in either direction from the mid-position illustrated by the solid lines in FIG. 2. The adjusting lever 15 includes an upwardly extending tail 17 at the rear end and a resilient member or spring 18 is arranged to straddle this tail 17. The spring 18 is arranged to bias the adjusting lever 15 to the mid-position shown by the solid lines in FIG. 2, movement of the adjusting lever to one side or the other for accomplishing the regulation of the timekeeping device being against the bias of the spring 18. The other end 19 of the adjusting lever extends adjacent to a rotatable arcuate member or disk 20 which is incorporated with the time setting means 9. As can be seen from FIG. 1, when the time setting means is moved to the setting or dotted line position illustrated, the lower beveled surface of the member 20 is brought into engagement with the inclined tip 19 of the adjusting lever 15.

Arranged on the shaft 16 immediately below the adjusting lever 15 is a disk 22. A pinion 23 is secured to or formed integral with the disk 22. This pinion 23 is arranged to engage the teeth of a sector element 24 which is pivotally mounted on a shaft 25. Thus rotation of the disk 22 and the pinion 23 effects a rotation of the sector element 24. A depending hook or member 26 is mounted on the sector element 24. This hook 26 is arranged to engage the hairspring 5 for determining the effective length of the hairspring and hence the rate of oscillation of the mechanism controlled thereby. As the sector element 24 is moved in one direction or the other by the aforementioned pinion 23, it can be seen that the hook 26 moves in one direction or the other along the length of the hairspring 5, thereby varying the effective length thereof.

In order to effect such movement of the sector gear, provision is made for engagement of the disk 22 by the adjusting lever 15. Thus the adjusting lever 15 includes a depending projection 27 generally in line with an area of the disk 22 in the region of the circumference thereof. The projection 27 is normally slightly spaced from the surface of the disk 22, as illustrated in FIG. 1, or rides lightly on the disk without exerting pressure. However, the time setting means 9 is arranged so that when it is slightly moved to the setting, or dotted line, position, it not only engages the tip 19 of the adjusting lever but also moves the lever 15 to the dotted line position shown in FIG. 1 and thereby forces the projection 27 into firm frictional engagement with the upper face of the disk 22. Although in FIG. 1 the lever 15 has been illustrated as somewhat flexible so that it bends to the position shown, it will be apparent that it could be a rigid member tiltable to the disk-engaging position about its relatively loose pivot. The aforementioned movement of the lever 15 provides a frictional engagement between the lever 15 and the disk 22 so that as the adjusting lever 15 is moved laterally in one direction or the other toward one of the dotted line positions shown in FIG. 2, a corresponding rotation of the disk 22 is effected. This rotation, as indicated above, is transmitted through the pinion 23 to the sector element 24 to effect a shifting in the regulating mechanism.

In order to assist in securing good frictional contact between the projection 27 and the upper face of the disk 22, the entire upper face, or at least an annular portion in the region of the projection 27, is formed of a material adapted to provide such good frictional engagement. For example, a thin coating of rubber or plastic indicated by 28, may be applied to the upper surface of the disk 22 or at any rate to an annular region thereof in general alignment with the projection 27.

In order to further assist in securing movement of the adjusting lever and the regulating mechanism in accordance with rotation of the time setting means, the beveled under surface 21 of the member 20 on the shaft 10 may be formed with small serrations. Corresponding grooves or serrations may be formed in the inclined tip 19 of the adjusting lever 15. Alternatively, of course, suitable frictional surfaces may be provided on one or both of these engaging elements. Thus, for example, either the surface 21 or the tip 19 or both may be provided with a rubber or plastic coating similar to that employed on the upper surface of the disk 22.

The operation of my automatic regulating mechanism will be readily understood from the above description. Thus when it is desired to set the time indicating means of the timekeeping device, the time setting means 9 is moved by means of the knob 13 from the solid line position to the dotted line position shown in FIG. 1. This movement of the time setting means to the setting, or dotted line, position first effects engagement of the tip 19 of the adjusting lever by the under surface 21 of the member 20. The final movement to the setting means then results, as explained above, in a movement of the adjusting lever 15 so as to bring the projection 27 into engagement with the upper surface 28 of the disk 22. The knob 13 is now rotated in one direction or the other to set the timekeeping device to the correct time. As the knob 13 is rotated, the shaft 10 and the member 20 fixed thereon are correspondingly rotated. This rotation of the member 20, through engagement with the adjusting lever 15, effects a proportional movement of the adjusting lever 15 toward the upper or lower dotted line position illustrated in FIG. 2.

As explained above, by means of the engagement between the projection 27 and the upper surface 28 of the disk 22, this lateral movement of the adjusting lever 15 effects a corresponding rotation of the disk 22. This rotation is transmitted through the pinion 23 and the teeth of the sector element 24 to cause a corresponding rotation of the sector element and a shifting of the hook 26 to vary the effective length of the hairspring 5 and hence to regulate the speed of the timekeeping device. The relationship of the elements is such that when the hands of the timekeeping device are moved forward by the time setting means 9, that is, when the timekeeping device has been running slow, the sector element 24 is shifted to decrease the effective length of the spring and thereby to increase the speed of the timekeeping device. The converse adjustment of the regulating mechanism is, of course, secured if the timekeeping device has been running fast and the hands are moved backward by the time setting means 9. When the knob 13 is released, the time setting means 9 returns to the solid line position shown in FIG. 1. The member 20 is disengaged from the adjusting lever 15, the pressure of projection 27 against disk 22 is relieved, and the lever 15 returns to its solid line position in FIG. 1. The spring 18 then returns the adjusting lever 15 to the mid-position shown by the solid lines in FIG. 2. The sector element 24 is frictionally held in its adjusted position as the adjusting lever 15 returns to its mid-position.

The amount of movement of the adjusting lever 15 and hence the change in the setting of the regulating mechanism is, as also explained above, proportional to the amount of movement of the time setting means 9 and therefore proportional to the distance which it is necessary to move the time setting means 9 of the timekeeping device in order to set the device to the correct time. In accordance with my invention, however, provision is made for limiting the movement of the adjusting lever and hence of the regulating mechanism to a predetermined maximum regardless of the extent of movement of the time setting mean beyond such predetermined maximum. This is desirable, of course, where the amount which the time indicating elements differ from the correct time is not attributable to the running speed of the timekeeping device; for example, when the device has been allowed to run down and stop or where a change is made for daylight saving time, zone change and the like.

In the form shown in FIGS. 1 and 2, this limitation of movement of the adjusting lever 15 to the aforementioned predetermined maximum is achieved simply by allowing the lever 15 to move out of engagement with the member 20 after a predetermined maximum movement of the time setting means. Thus, for example, if the time setting means 9 is rotated in a clockwise direction as viewed in FIG. 2, the adjusting lever 15 will be moved toward the upper dotted line position indicated by 15a. When the time setting means has been moved by a predetermined maximum amount, the adjusting lever 15 will reach the position 15a at which point it is in effect disengaged from the member 20 so that further rotation of the member 20 cannot cause any movement of the adjusting lever. Correspondingly, if the time setting means 9 is moved in a counterclockwise direction, the maximum movement of the adjusting lever 15 will be to the lower dotted line position indicated by 15b in FIG. 2. Thereafter, further counterclockwise movement of the member 20 has no effect in causing any further lateral movement of the adjusting lever 15. It can be seen, therefore, that I have provided an automatic regulating means which automatically secures proportional movement of the regulating mechanism in accordance with the setting of the timekeeping device to the correct time, and at the same time I have provided an arrangement whereby this proportional adjustment is limited to a predetermined maximum amount so that large changes in the regulating mechanism under conditions where such changes are unnecessary and undesirable are avoided.

In FIGS. 3 and 4 there is shown a modified form of my invention which differs from that described above in that a different structure for engagement between the adjusting lever and the disk is provided. The adjusting lever 15 is constructed and mounted in exactly the same manner as in the form previously described. This lever includes the same depending projection 27 extending toward the disk 22′, which corresponds generally to the disk 22 in the form previously described. In lieu of the rubber or plastic surface 28 provided on the face of the disk 22 in the form previously described, however, the disk 22 is provided with an annular serrated portion 29 on the upper surface thereof. This annular serrated surface 29 is arranged in alignment with the depending projection 27 so that when the adjusting lever 15 is moved downwardly to a position corresponding to that shown in dotted lines in FIG. 1, the projection 27 firmly engages the serrations of the surface 29 so that the disk 22' is rotated when the adjusting lever 15 is shifted laterally.

In FIGS. 5 and 6 there is shown another modified form of my invention which differs from that previously described in that a different arrangement for limiting the movement of the adjusting lever and hence of the regulating mechanism to a predetermined maximum amount is provided. Corresponding parts have been given the same numerals in FIGS. 5 and 6 and in FIGS. 1 and 2. The upper portion only of the time setting means 9 is illustrated in FIGS. 5 and 6. This includes a shaft 10 and the member 20 having the lower beveled serrated or frictional surface 21 for engagement with the tip, designated 19', of an adjusting lever 15', corresponding to the lever 15 as shown in FIGS. 1 and 2.

In this form of my invention an upwardly extending stationary pin 30 is mounted on the support or mounting plate 1. The adjusting lever 15' is formed to provide two openings 31 and 32, one of these openings being provided on each side of the center line of the adjusting lever 15'. The stationary pin 30 is disposed generally midway between the openings 31, 32, that is, generally along the center line of the adjusting lever 15', when the adjusting lever is in its normal or mid-position. Movement of the adjusting lever to one side or the other, that is, upwardly or downwardly as viewed in FIG. 6, is accomplished in the same manner as described above by the rotation of the shaft 10 of the time setting means. When the time setting means is moved to a position corresponding to the dotted line position in FIG. 1, the adjusting lever 15' is moved downwardly into contact with the stationary pin 30. This has no effect at the time on the movement of the adjusting lever 15' except, of course, to introduce some additional friction. However, when the time setting means has been turned a predetermined maximum amount, for example, in a clockwise direction as viewed in FIG. 6, the opening 32 in the adjusting lever 15' is brought into registry with the stationary pin 30 so that the pin 30 projects upwardly through the opening 32 in the adjusting lever 15' and thereby limits the movement of the adjusting lever 15' to the predetermined maximum amount necessary to move the opening 32 into registry with the pin 30. This, of course, correspondingly limits the change in the setting of the regulating mechanism associated with the adjusting lever 15'. A corresponding limitation of the movement of the adjusting lever 15' in the opposite direction is provided by engagement of the pin 30 in the other opening 31. Thus, as in the form previously described, proportional movement of the adjusting lever and hence of the regulating mechanism is secured and at the same time this movement is limited positively to a predetermined maximum amount. Also, it will be noted that the arrangement disclosed, after engagement of the pin 30 with either of the openings 31, 32, any reverse movement of the time setting means can have no effect on the regulating mechanism. Thus if, in making such a substantial change in the time setting, the user should overshoot and then have to back up, no unnecessary and undesirable corresponding reverse adjustment of the regulating mechanism will occur.

Figure 7:
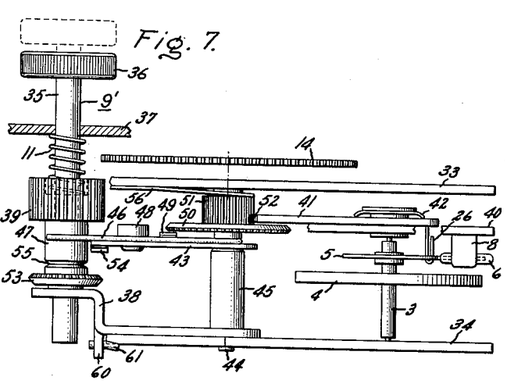
FIG. 7 is an elevation view, partly broken away and showing only essential parts, of a modified form of timekeeping device incorporating another embodiment of my invention.
Figure 8:
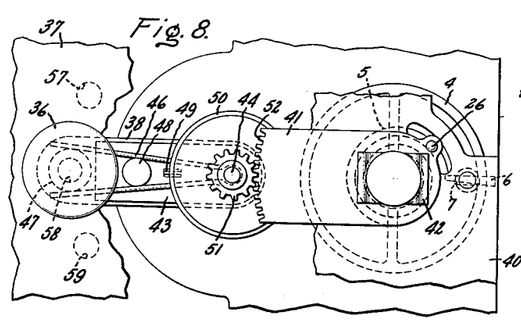
FIG. 8 is a plan view of the mechanism shown in FIG. 7.

In FIGS. 7 through 10 inclusive, there is illustrated another embodiment of my invention. The same numerals have been used to designate corresponding parts in the FIGS. 7 through 10 and in FIGS. 1 and 2. Referring to FIGS. 7 and 8, it can be seen that this form of my invention employs two spaced mounting plates 33 and 34, corresponding generally to the mounting plates 1 and 2 in the form previously described. A gear 14 has been generally indicated, this gear, as in the form previously described, being in a completed timekeeping device connected to a train of gears for moving the hands of the clock to set the clock at the correct time. A time setting element 9', corresponding to the member 9 in the form previously described, is illustrated as including a shaft 35 and a manually actuatable knob 36. The time setting means 9' is slidably mounted in an adapter plate 37 and a support bracket 38. It includes a pinion 39, corresponding to the pinion 12 in the form previously described, which is adapted, after sliding movement of the time setting means, to be moved into engagement with the time setting gear 14. The shaft is biased to the position shown by the solid lines in FIG. 7 by a spring 11 which engages the adapter plate 37 and the pinion 39.

As in the form previously described, the timekeeping device includes a balance shaft 3 upon which is mounted a balance wheel 4 and a hairspring 5. One end of the hairspring 5 is secured to the shaft 3, and the other end is secured by a wedge 6 in an opening 7 in a depending plate 8 supported from a suitable mounting plate, a portion of which is shown at 40. In accordance with my invention, the effective length of the hairspring and hence the rate of oscillation of the mechanism associated therewith is automatically varied as the timekeeping device is set to the correct time.

In this modified form of my invention, this adjustment of the mechanism is accomplished in the same general manner as in the previous form of my invention but by the use of somewhat different structural parts. Thus in the form shown in FIGS. 7 through 10 inclusive, an element 41, corresponding generally to the sector element 24 in the form previously described, is rotatably mounted on the mounting plate 40 in the same general manner as the sector element 24 was mounted on the mounting plate 1 in the form previously described. A resilient member 42 is provided in frictional engagement with the element 41 to assist in maintaining it in any adjusted position. Mounted on and depending from the element 41 is a hook 26 which is arranged to engage the hairspring 5 so as to vary the effective length thereof as the element 41 is moved in one direction or the other.

In order eo effect automatic adjustment of the position of the element 41 and hence to effect automatic regulation of the timepiece, a mechanism is provided for interconnecting the time setting means 9' and the element 41. This mechanism includes an adjusting lever 43, corresponding in function to the adjusting lever 15 of the form previously described, mounted on a shaft 44. The adjusting lever 43 is loosely pivoted so that it is tiltably mounted on the shaft 44. An enlarged portion of the shaft or a spacer 45 is provided between the supporting bracket 38 and the adjusting lever 43. A spring 46 is also mounted on the shaft 44 and includes two arms extending outwardly into engagement with opposite sides of a collar 47 mounted on the shaft 35 of the time setting means 9'. The adjusting lever 43 includes a projection 48 extending upwardly therefrom and adapted to be engaged on opposite sides by the two arms of the spring 46. The spring 46 urges the adjusting lever 43 to its mid-position as illustrated by the solid lines by engagement of the projection 48, and one or the other of the arms of the spring returns this lever 43 in all cases to this mid-position after adjustment in one direction or the other has been effected.

The lever 43 further includes a second projection 49 corresponding to the projection 27 in the form previously described, which is arranged to engage the teeth of a crown gear 50, corresponding in function to the disk 22 in the form previously described. The crown gear 50 is rotatably mounted on the same shaft 44 as the adjusting lever 43; the aforementioned time setting gear 14 is also mounted on this same shaft 44. In the drawing the time setting gear has been indicated as mounted on the same axis with adjusting lever 43 and the crown gear 50 merely by extending a center line from the shaft 44. Details of the specific mounting of the time setting gear 14, which may be conventional, have been omitted. When the projection 49 is in engagement with the crown gear 50, movement of the lever 43 is transmitted to the crown gear 50.

A pinion 51, corresponding to the pinion 23 in the form previously described, is mounted integral with or in fixed engagement with the crown gear 50, and is positioned on the shaft 44 so as to rotate along with the crown gear 50. This pinion 51 is arranged in engagement with teeth 52 of the element 41 so as to effect movement of the element 41 for speed regulation upon rotation of the pinion 51. It can be seen that movement of the adjusting lever 43 in one direction or the other about its mid-point effects a corresponding movement of the element 41 and hence, regulation of the timekeeping device. In order to effect movement of the adjusting lever 43 coincident with the setting of the time of the timekeeping device, the time setting means 9' is constructed so as to effect engagement with the adjusting lever 43 when the knob 36 and shaft 35 are moved to the time setting position indicated by the dotted lines in FIG. 7. Specifically, a crown gear 53 is mounted on the shaft 35 to rotate therewith, and the adjusting lever 43 includes a downwardly extending projection 54 which is adapted to engage the upwardly disposed teeth of the crown gear 53. Thus, as the time setting means 9' is moved upwardly to the dotted line position shown in FIG. 7, corresponding to the position illustrated in FIG. 9, the crown gear 53 is brought into engagement with the projection 54 of the adjusting lever 43. Movement of the time setting means 9' also carries the projection 49 of the adjusting lever 43 upwardly into engagement with the crown gear 50. This is assisted by engagement of the arms of the spring 46 with a groove 55 formed in the collar 47.

Figure 9:
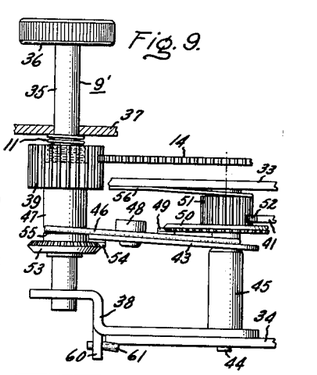
FIG. 9 is a view of a portion of the mechanism as shown in FIG. 7, with the parts indicated in the position they occupy during the time-setting operation.

When the parts occupy the position shown in FIG. 9, it can be seen that rotation of the knob 36 to adjust the time setting of the timekeeping device, by engagement of the pinion 39 and the time setting gear 14, also is effective for moving the regulating element 41 to regulate the speed of the timekeeping device. This latter movement is accomplished through rotation of the crown gear 53 which, by engagement with the projection 54, effects movement of the adjusting lever 43. Engagement of the projection 49 with the crown gear 50 in turn effects movement of the pinion 51 and hence, corresponding movement of the lever 41 to effect the change in the effective length of the hairspring 5.

As in the form previously described, this embodiment of my invention is arranged to limit the regulation obtained to a predetermined maximum. Thus, after the shaft 35 has been rotated a predetermined amount, corresponding, for example, to a change in the time setting of five minutes, the projection 54 is moved out of engagement with the teeth of the crown gear 53 and further rotation of the shaft 35 therefore causes no further movement of the adjusting lever 43. Hence, there is also no further movement of the element 41. This corresponds in general to the limiting arrangement shown in the forms illustrated in FIGS. 1 and 2. It will be apparent, of course, that a positive limiting arrangement of the type shown in FIGS. 5 and 6 could also be incorporated in the embodiment of FIGS. 7 through 10 inclusive if that should be desired.

In the embodiment shown in FIGS. 7 through 10, the mechanism is constructed so that the projection 49 is disengaged from the crown gear 50 before the projection 54 of the adjusting lever 43 is disengaged from the crown gear 53. This is effected by cooperation between the spring 46 and the groove 55. This is illustrated to best advantage in FIG. 10. Thus, as the time setting means 9' is returned toward its original position under the bias of the spring 11, the adjusting lever 43 is first tilted to the position shown in FIG. 10. It will be noted that the lever 43 is here tilted about its loose pivot in the opposite direction to its tilt in the time setting position shown in FIG. 9. The lever 43 is carried to this FIG. 10 position by the aforementioned engagement of the spring 46 with the groove 55. In the position shown in FIG. 10, it can be seen that the projection 49 has already become disengaged from the crown gear 50, but the projection 54 is still in engagement with the crown gear 53. At this point, the adjusting lever is normally still in its adjusted position, that is, moved to one side or the other by the aforementioned rotation of the shaft 35. As the shaft 35 is moved still further and ultimately to the position shown in FIG. 7, the adjusting lever 43 reaches the limit of its tilt in the direction shown in FIG. 10 and the arms of the spring 46 are thereby forced out of engagement with the groove 55. This allows the adjusting lever 43 and the spring 46 to move to the dotted line position shown in FIG. 10, wherein the projection 54 is no longer engaged with the crown gear 53. At the same time, the adjusting lever 43 is returned to its mid-position, illustrated in FIG. 8, by the spring 46. However, the projection 49 has already been disengaged from the crown gear 50 so that this return of the adjusting lever 43 to its mid-position can have no effect whatever on the crown gear 50 nor on the element 41. Hence, any reverse effect on the regulating mechanism resulting from the return of the adjusting lever 43 to its mid-position is positively prevented.

As a further safeguard to assure that the angular position of the pinion 51 and hence of the element 41 is not changed when the time setting shaft 35 is released, a flat spring 56 is secured to the mounting plate 33 and biased into frictional engagement with the pinion 51.

Figure 10:
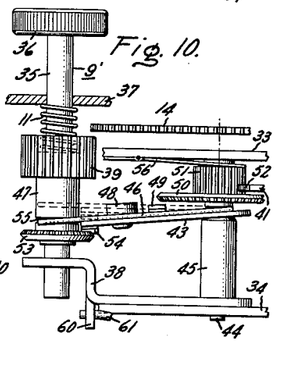
FIG. 10 is a view similar to FIG. 9 showing the parts in another position.

Mechanisms of the type disclosed in my invention may be employed with a wide variety of adapter plates for use with different model automobiles. In connection with different automobiles, it may be desirable to have the time setting means positioned in somewhat different locations. In accordance with this embodiment of my invention, an arrangement is provided for conveniently positioning the time setting means in any of several different positions. To accomplish this result, the adapter plate 37 is provided with a plurality of openings 57, 58 and 59. The openings 57, 58 and 59 are located along an arc of a circle having its center at the axis of the shaft 44. It will be apparent that any number of spaced openings may be provided to give a multiplicity of positions. The shaft 35 may be inserted through any of these several openings 57, 58 and 59, and the upper end of the shaft is supported thereby. To position the lower end of the shaft in any of these several positions, the supporting bracket 38 is rotatably mounted on the shaft 44. This bracket includes a depending leg 60 having a transverse, horizontally extending opening (not shown) therein. After the shaft 35 has been inserted in the proper one of the openings 57, 58 or 59, a locating pin 61 is inserted through the transverse opening in the depending leg 60 and this pin 61 driven into engagement with an edge of the mounting plate 34. The shaft 35 is first, of course, positioned in a vertical direction as viewed in FIG. 7, the supporting bracket being rotated about the shaft 44 to the proper position; thereafter the locating pin is driven in place to hold it in its position. The locating pin deforms the edge of the mounting plate 34, as generally indicated in FIGS. 7 and 10.

It can be seen that this multiple positioning of the time setting means is facilitated by the fact that the time setting gear 14, the adjusting lever 43, and the supporting bracket 38 are all pivoted on the common shaft 44, or at least on a common axis.

Figures 11, 12:
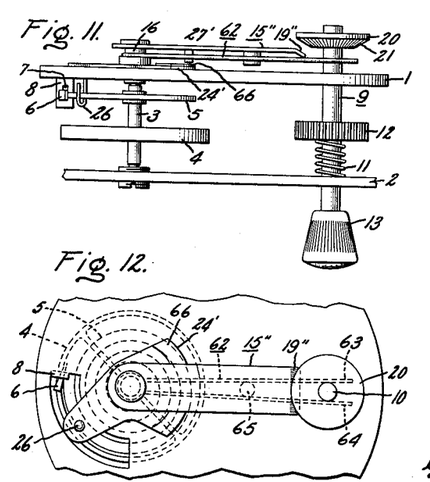
FIG. 11 is an elevation view of a portion of a timekeeping device showing another embodiment of my invention.
FIG. 12 is a plan view of the mechanism shown in FIG. 11.

Another modified form of my invention is shown in FIGS. 11 and 12. This form of my invention corresponds very closely with that shown in FIGS. 1 and 2 and differs primarily in that the disk 22 is omitted and the regulating sector is adjusted directly from the adjusting lever. The same numerals have been employed to designate corresponding parts in FIGS. 1 and 2 and in FIGS. 11 and 12.

Thus, the mechanism shown in FIGS. 11 and 12 includes a time setting means 9 having a shaft 10 and a knob 13, biased by a spring 11 to the position shown in FIG. 11. A gear 12 is mounted on the shaft 9 for engagement with a time setting gear not shown in this figure. An adjusting lever 15" is loosely pivoted for rotation by stud 16. The adjusting lever 15" includes a depending projection 27' which is adapted to directly engage a sector element 24'. The sector element 24' includes a hook 26 for engaging the hair-spring 5 to change its effective length in the same general manner as in the form shown in FIGS. 1 and 2. In this form of my invention, a spring 62, corresponding generally to the spring 18 in the form of FIGS. 1 and 2, is mounted on the stud 16 and includes arms 63 and 64 engaging opposite sides of the shaft 10. A depending stud 65 is mounted thereon or formed integral with the adjusting lever 15" and extends between the arms 63 and 64 so as to be engaged on opposite sides by these arms. The spring 62 biases the adjusting lever 15" to the mid-position shown in FIG. 12.

When the time setting knob 13 is moved outwardly against the bias of the spring 11 in this form of my invention, the member 20 is brought into engagement with the end 19" of the adjusting lever 15" and the adjusting lever is moved, by bending or tilting, so that the projection 27' is brought into engagement with a frictional surface 66 formed along one edge of the sector element 24'. As the knob 13 is then rotated to set the timekeeping device, the adjusting lever 15" is rotated about the stud 16 and the resultant movement of the projection 27' causes a movement of the sector element 24' to regulate the timekeeping mechanism. It will be appreciated, therefore, that in this form of my invention, the movement of the adjusting lever 15" is transmitted directly to the element 24' for regulating the mechanism. This simplifies the structure, but, of course, somewhat limits the fineness of regulation which can be obtained, since a greater movement of the element 24' is obtained for a corresponding movement of the adjusting lever 15" than in the form shown in FIGS. 1 and 2.

It will be apparent that the maximum regulation obtained is again limited in this form of my invention in the same manner as in the form shown in FIGS. 1 and 2. Thus, after a maximum movement of the adjusting lever either up or down, as viewed in FIG. 12, the lever moves to the limit of its engagement with the surface 21 of the member 20, and further rotation of the shaft 10 has no further regulating effect on the mechanism.

While I have shown and described specific embodiments of my invention, I do not desire my invention to be limited to the particular constructions shown and described, and I intend by the appended claims to cover all modifications within the spirit and scope of my invention.

What I claim as new and desire to secure by Letters Patent of the United States is:

1. A timekeeping device comprising time indicating means, means for setting said time indicating means, regulating means for adjusting the running speed of said device, a pivoted adjusting lever engaged by said setting means for effecting movement of said lever, said lever engaging said regulating means for effecting adjustment of said regulating mechanism, movement of said adjusting lever being proportional to the movement of said setting means below a predetermined maximum amount, and means for allowing said lever to become disengaged from said setting means when movement of said setting means exceeds the aforementioned predetermined maximum amount.

2. A timekeeping device comprising time indicating means, means for setting said time indicating means, regulating mechanism for adjusting the running speed of said device, an adjusting lever engaged by said setting means when in its setting position for transferring movement of said setting means to said regulating mechanism, movement of said adjusting lever being proportional to the movement of said setting means below a predetermined maximum amount, and means for allowing said lever to become disengaged from said setting means when movement of said setting means exceeds the aforementioned predetermined maximum amount.

3. A timekeeping device comprising time indicating means, means for setting said time indicating means, regulating mechanism for adjusting the running speed of said device, a pivoted adjusting lever having a portion positioned adjacent said setting means, a rotatable disk positioned adjacent said lever, said setting means engaging said portion of said lever when in its setting position for moving said lever into engagement with the face of said disk, said setting means being rotatable during the time setting operation for effecting movement of said lever and said disk, and means connecting said disk and said regulating mechanism for causing movement of said disk to effect adjustment of said regulating mechanism.

4. The combination of claim 3 wherein said adjusting lever is flexible and wherein said lever is bent by said setting means into engagement with the face of said disk.

5. The combination of claim 3 wherein said adjusting lever includes a projection extending toward said disk and said disk includes a surface providing frictional engagement with said projection whereby movement of said lever effects rotation of said disk and corresponding adjustment of said regulating mechanism.

6. A timekeeping device comprising time indicating means, means for setting said time indicating means, regulating mechanism for adjusting the running speed of said device, a pivoted adjusting lever having a portion positioned adjacent said setting means, a rotatable disk positioned adjacent said lever, said setting means including a slidable shaft and a member mounted on said shaft, said member being movable between a setting position and a non-setting position, said member engaging said portion of said lever when said setting means is in its setting position for moving said lever into engagement with the face of said disk, said setting means being rotatable during the setting operation for effecting lateral movement of said lever and rotation of said disk, and means connecting said disk and said regulating mechanism for causing movement of said disk to effect adjustment of said regulating mechanism.

7. A timekeeping device comprising time indicating means, means for setting said time indicating means, regulating mechanism for adjusting the running speed of said device, a pivoted adjusting lever having a portion positioned adjacent said setting means, a rotatable disk positioned adjacent said lever, said setting means engaging said portion of said lever when in its setting position for moving said lever into engagement with the face of said disk, said setting means being rotatable during the setting operation for effecting movement of said lever and said disk in proportion to the movement of said setting means, means connecting said disk and said regulating mechanism for causing movement of said disk to effect adjustment of said regulating mechanism, and means for limiting the movement of said lever to a predetermined maximum amount.

8. A timekeeping device comprising time indicating means, means for setting said time indicating means, regulating mechanism for adjusting the running speed of said device, a pivoted adjusting lever having one end positioned adjacent said setting means, a rotatable disk positioned adjacent said lever, said setting means including a shaft and a rotatable arcuate member thereon, said member being adapted to engage said end of said lever when said setting means is in its setting position for moving said lever into engagement with said disk, said setting means being rotatable during the setting operation for effecting movement of said lever and said disk in proportion to the movement of said setting means, said end of said lever moving out of engagement with said arcuate member after a predetermined maximum movement thereof whereby further movement of said setting means is ineffective to cause further movement of said lever and the adjustment of said regulating means is limited to a predetermined maximum amount.

9. A timekeeping device comprising time indicating means, means for setting said time indicating means, regulating mechanism for adjusting the running speed of said device, an adjusting lever for connecting said setting means and said regulating mechanism, said setting means engaging said lever when said setting means is in its setting position for shifting said lever and thereby said regulating mechanism in proportion to the amount of movement of said setting means, and means for allowing said lever to become disengaged from said setting means when movement of said setting means exceeds a predetermined maximum amount.

10. A timekeeping device comprising time indicating means, means for setting said time indicating means, regulating mechanism for adjusting the running speed of said device, a pivoted adjusting lever for connecting said setting means and said regulating mechanism, said lever having one end positioned adjacent said setting means, said setting means including a shaft having a rotatable arcuate member thereon, said member being adapted to engage said end of said lever when said setting means is in its setting position, said setting means being rotatable during the setting operation for effecting movement of said lever in proportion to movement of said setting means, said one end of said lever moving out of engagement with said arcuate member after a predetermined maximum movement thereof whereby further movement of said setting means is ineffective to cause further movement of said lever and the adjustment of said regulating means is limited to a predetermined maximum amount.

11. The combination of claim 10 wherein said adjusting lever is loosely pivoted and wherein said lever is tilted by said setting means about the loose pivot of said lever for moving said lever into engagement with the face of said disk.

12. The combination of claim 10 wherein said lever includes a projection extending toward said disk, and the face of said disk includes a serrated portion in line with said projection and adapted to be engaged by said projection whereby movement of said lever effects rotation of said disk and corresponding movement of said regulating mechanism.

13. A timekeeping device comprising time indicating means, means for setting said time indicating means, regulating mechanism for adjusting the running speed of said device, a pivoted adjusting lever having a portion positioned adjacent said setting means, a rotatable circular member positioned adjacent said lever, said setting means including a slidable shaft and a member mounted on said shaft, said setting means being movable between a setting position and a non-setting position, said adjustable lever including a first projection for engaging said last-named member and a second projection for engaging said circular member when said setting means is in its setting position, said setting means being rotatable during the setting operation for effecting movement of said lever about its pivot and rotation of said circular member, and means connecting said circular member and said regulating mechanism for causing movement of said circular member to effect adjustment of said regulating mechanism.

14. A timekeeping device comprising time indicating means, means for setting said time indicating means, regulating mechanism for adjusting the running speed of said device, means for connecting said setting means to said regulating means when said setting means is in its setting position for shifting said regulating mechanism in proportion to the movement of said setting means below a predetermined maximum amount, and means for allowing said means for connecting said setting means to said regulating means to disconnect said setting means from said regulating means when the movement of said setting means exceeds the aforementioned predetermined maximum amount.

15. In a clock mechanism, a hand setting mechanism including a member mounted for translatory and rotary movement, a running mate regulator having adjusting means, a driving connection for transmitting the rotary movement, a running rate regulator having adjusting means, said driving connection being rendered operative by the translatory movement of the first-mentioned member and rendered inoperative after a predetermined rotary movement of said member to transmit any further rotary movement of said member, in either direction, to said regulator adjusting means.

16. A device for automatic and simultaneous regulation of the escapement hair spring of a clock in connection with the setting of the hands of said clock comprising: a rotatable adjusting shaft for setting the hands of said clock and carrying a first engaging means, regulating means for said hair spring, driving means operatively engaging said regulating means and carrying a second engaging means, and coupling means positioned between said first engaging means and said second engaging means to couple the two when said adjusting shaft is operated.

17. A device for automatic and simultaneous regulation of the escapement hair spring of a clock in connection with the setting of the hands of said clock comprising: a rotatable adjusting shaft for setting the hands of said clock and a crown gear affixed to the end of said adjusting shaft, regulating means for said hair spring, driving means operatively engaged at one end with said regulating means and having a gear affixed to the other end thereof, and a spring finger positioned between said gear and said crown gear to engage between the two when said adjusting shaft is operated.

18. A device as claimed in claim 17 and further characterized in that said regulating means for said hair spring operates less in proportion to the amount of movement effected by said adjusting shaft and has a fixed maximum amount of regulation.

19. A device for automatic and simultaneous regulation of the escapement hair spring of a clock in connection with the setting of the hands of said clock comprising: regulating means for said escapement hair spring, driving means operatively engaging said regulating means, a rotatable adjusting shaft for setting the hands of said clock, and engaging means between said driving means and said adjusting shaft to engage said driving means through a predetermined fraction of revolution of said adjusting shaft and thereafter disengage said driving means from said adjusting shaft upon continued revolution of said adjusting shaft.

20. Rate regulating means for a clock movement having adjustable rate control means and adjustable hand setting means each of said means having a wheel shaped for engagement with a spring member, a spring member mounted for swinging movement and positioned when unstressed between said wheels whereby to be engaged with both wheels when one of said wheels is moved toward the other, said spring member being swingable upon rotation of one of said wheels with which it is engaged to force concomitant movement of the other wheel.

21. Rate regulating means for a clock movement having adjustable rate control means and adjustable hand setting means each of said means having a wheel peripherally shaped for engagement with a spring member, a spring member mounted for swinging movement and positioned when unstressed between said wheels whereby to be engaged with both wheels when one of said wheels is moved toward the other, said spring member being swingable upon rotation of one of said wheels with which it is engaged to force concomitant movement of the other wheel.

22. A clock movement including hand setting means movable to and from hand setting position, rate regulating means including a shaft movable in one direction to increase the rate and in another direction to reduce the rate, said hand setting means and said shaft having operating elements which are brought into closer proximity when one of said elements is moved, and a swingable operating member positioned to be drawn between and into engagement with said operating elements in the movement of said hand setting means for a limited swinging movement.

References Cited in the file of this patent
UNITED STATES PATENTS

| | | |
|---|---|---|
| 2,542,430 | Rabinow | Feb. 20, 1951 |
| 2,554,029 | Holdman | May 22, 1951 |

UNITED STATES PATENT OFFICE
CERTIFICATE OF CORRECTION

Patent No. 3,177,648                                          April 13, 1965

Robert L. Boyles

It is hereby certified that error appears in the above numbered patent requiring correction and that the said Letters Patent should read as corrected below.

Column 1, line 9, for "timekeeper" read -- timekeeping --; column 2, line 45, before "the time" insert -- of --; line 57, for "adjusted" read -- adjusting --; column 3, line 9, after "For" insert -- a --; column 8, line 38, for "eo" read -- to --; column 14, line 1, beginning with "In a clock mechanism" strike out all to and including "adjusting means." in line 11, same column 14, and insert instead the following:

> In a clock mechanism, a hand setting mechanism including a member mounted for translatory and rotary movement, a running rate regulator having adjusting means, a driving connection for transmitting the rotary movement of said member to said regulator adjusting means, said driving connection being rendered operative by the translatory movement of the first-mentioned member and rendered inoperative after a predetermined rotary movement of said member to transmit any further rotary movement of said member, in either direction, to said regulator adjusting means.

Signed and sealed this 7th day of December 1965.

(SEAL)
Attest:

ERNEST W. SWIDER                                      EDWARD J. BRENNER
Attesting Officer                                  Commissioner of Patents